S. CABOT.
SPACE TELEGRAPHY.
APPLICATION FILED MAY 6, 1909.
949,518.
Patented Feb. 15, 1910.
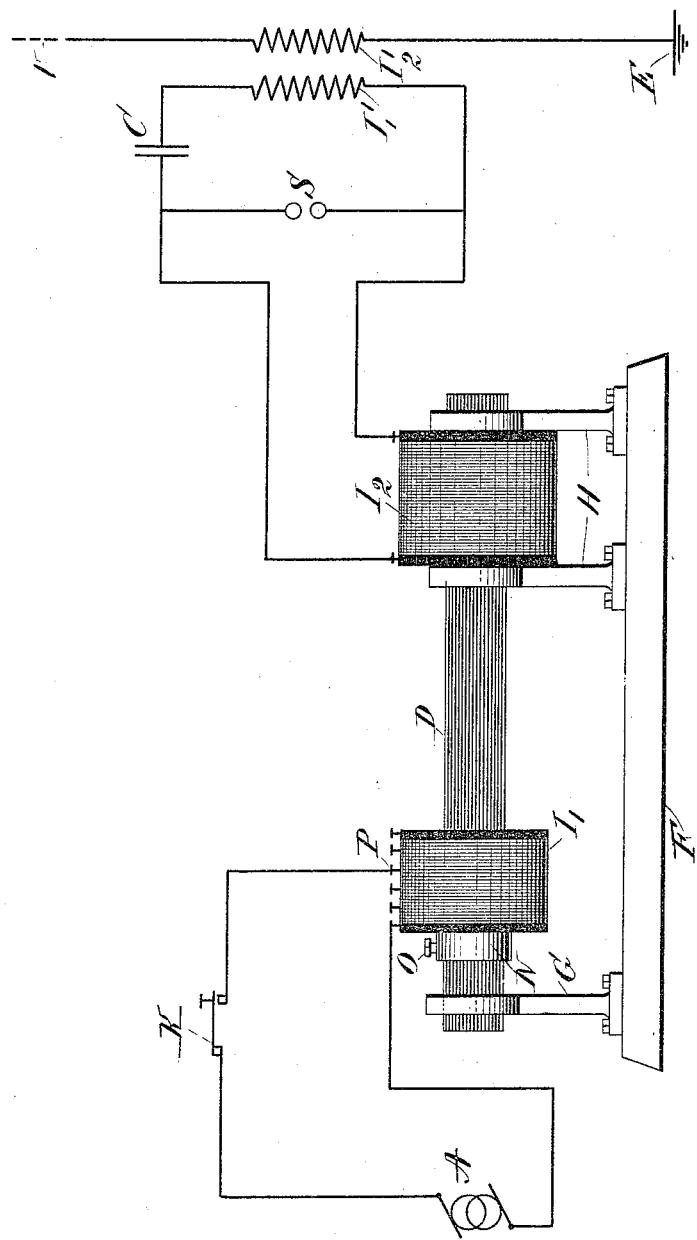
WITNESSES:
E. B. Tomlinson
Patrick J. Conroy
INVENTOR:
Sewall Cabot
by Browne & Woodworth
attys.

UNITED STATES PATENT OFFICE.

SEWALL CABOT, OF BROOKLINE, MASSACHUSETTS.

SPACE TELEGRAPHY.

949,518.  Specification of Letters Patent.  Patented Feb. 15, 1910.

Application filed May 6, 1909. Serial No. 494,493.

*To all whom it may concern:*

Be it known that I, SEWALL CABOT, a citizen of the United States, and a resident of Brookline, in the county of Norfolk and State of Massachusetts, have invented a new and useful Improvement in Space Telegraphy, of which the following is a specification.

My invention relates to space telegraphy and more especially to space telegraph transmitting systems in which a sonorous or persistently-oscillating circuit including a condenser is energized by low potential alternating current through the intermediary of a step-up transformer.

The object of my invention is to improve the construction of such transmitting systems in the manner hereinafter set forth whereby the circuit which includes the secondary of the step-up transformer and the condenser of the sonorous circuit is made resonant to the frequency of the alternating current in the power circuit which includes the primary of said transformer.

In carrying out my invention I employ an open magnetic-circuit transformer having a straight subdivided iron-core and arrange the primary and secondary of said transformer in tandem along said core with sufficient spatial separation to render the circuit which includes said secondary and the condenser of the sonorous circuit the equivalent of a circuit having a single degree of freedom. When the primary and secondary are so arranged, the said circuit which includes the secondary of the transformer and the condenser of the sonorous circuit may be made resonant to the frequency of the alternating current in the power circuit; arcing at the spark-gap of the sonorous circuit is greatly diminished or prevented; a power circuit transformer having a smaller ratio of transformation may be employed; and the number of turns of wire on the primary of said transformer may be varied to change the transformer load without appreciably affecting the inductance of the secondary winding or the resonance of the secondary circuit for currents of a given frequency.

I am aware that open magnetic-circuit transformers are not new; but so far as I am aware all such transformers employed in space telegraph transmitting systems are modifications of the induction-coil and have one winding inclosing the other, whereas I have found it impossible to obtain sufficiently large magnetic leakage or sufficiently small mutual inductance between the primary and secondary of a power circuit transformer to secure the results effected by the present invention unless the windings of said transformer are arranged in tandem along a straight core.

My invention may best be understood by having reference to the drawing which accompanies and forms part of this specification and represents partly in elevation and partly in diagram a space telegraph transmitting system.

In the figure V is an elevated transmitting conductor, E is an earth connection. $I_1$, $I_2'$ are the primary and secondary windings respectively of an air-core oscillation transformer, C is a condenser, S is a spark-gap, K is a key, A is an alternating current generator or other suitable source of low potential alternating current, and $I_1$, $I_2$ are the primary and secondary windings respectively of a power-circuit transformer.

The straight sub-divided iron core D of the power-circuit transformer may be supported by the standards G, H secured to the base F. The coils $I_1$ $I_2$ are supported by and placed in tandem along the core D and one of said coils such as $I_1$ is movable along the core and may be secured in adjusted position by the set screw O passing through the collar N which is fixed to the coil. The connections of the generator to the winding $I_1$ may be made through the binding posts P which are internally connected respectively to various portions of said winding in the usual manner.

The circuit, which includes the secondary $I_2$ of the power-circuit transformer and the condenser C of the sonorous circuit S C $I_1'$, may be made resonant to the frequency of the currents in the power-circuit A K $I_1$ when the spatial relation of the windings $I_1$ and $I_2$ is such that the mutual inductance between said windings is relatively small. I have obtained good results with coupling coefficients varying between .1 and .4. The constants of the circuit $I_2$ C $I_1'$ may be fixed and the circuit made resonant to the frequency of the currents in the power-circuit by adjusting the position of the winding $I_1$ along the core D. Having obtained such position of the coil $I_1$, if the frequency of the power-circuit currents is slightly increased, the resonance of the circuit $I_2$ C $I_1'$ may be maintained by decreasing the separation of the windings $I_1$ and $I_2$ so as to reduce the effective inductance of the winding $I_2$; and if the frequency of said currents is slightly decreased, such resonance may be maintained by increasing the separation of the windings $I_1$ and $I_2$.

When the primary and secondary windings of the power-circuit transformer are so spatially related that the circuit which includes the secondary of said transformer and the condenser of the sonorous circuit is the equivalent of a circuit having a single degree of freedom, the said circuit may be made resonant to the frequency of the alternating current in the power-circuit; arcing at the gap S will be greatly reduced or eliminated, and thereby the condenser C will receive its full charge during every half-cycle of the alternating current in the power-circuit; the ratio of transformation of the power-circuit transformer may be reduced, thereby permitting the use of a smaller number of turns of wire in the secondary winding $I_2$ on account of the amplification due to the resonance of the circuit which includes said winding; and the number of turns of wire in the primary winding $I_1$ which is connected in series with the generator may be varied to change the load on the transformer without appreciably affecting the effective inductance of the secondary winding $I_2$ or varying the period of the circuit which includes said secondary winding and the condenser C, because for all practical purposes the primary and secondary windings of the power-circuit transformer are mutually independent.

I am aware that heretofore it has been proposed to attune the circuit which includes the secondary of a power-circuit transformer and the condenser of an oscillation circuit to the frequency of the currents in the power-circuit and therefore I do not claim this construction broadly; but I believe it to be broadly new with me to render the circuit hereinbefore referred to as the circuit $I_2$ C $I_1'$ the equivalent of a circuit having a single degree of freedom, by means of a transformer having large magnetic leakage between its primary and secondary windings due to the spatial separation of the latter, so that therefore the said circuit may be made resonant to the power-circuit currents which have a single or definite frequency, in contradistinction to making the secondary circuit merely more responsive to one of the several frequencies which necessarily must exist in two systems closely connected by relatively large mutual inductance.

I claim:

A space telegraph transmitting system comprising in combination an elevated transmitting conductor, a sonorous circuit including a condenser associated with said elevated transmitting conductor, a source of alternating current of definite frequency, an open magnetic-circuit transformer having its primary connected with said source of alternating current and its secondary connected with said sonorous circuit, and a straight sub-divided iron-core for said transformer, the said primary and secondary being arranged in tandem along said core and having such spatial separation that the circuit which includes said secondary and said condenser is resonant to said frequency.

In testimony whereof, I have hereunto subscribed my name this 3rd day of May 1909.

SEWALL CABOT.

Witnesses:
E. B. TOMLINSON,
GEO. K. WOODWORTH.